United States Patent [19]

Visioli

[11] Patent Number: 5,897,901
[45] Date of Patent: Apr. 27, 1999

[54] METHOD FOR REMOVING COMPOUNDS CAUSING DISCOLORATION IN FRUIT/ VEGETABLES STORED IN SEE-THROUGH PACKAGING STRUCTURES

[75] Inventor: Donna Lynn Visioli, Lower Gwynedd, Pa.

[73] Assignee: E. I. du Pont de Nemours and Company, Wilmington, Del.

[21] Appl. No.: 08/602,520

[22] Filed: Feb. 20, 1996

[51] Int. Cl.$^6$ .................................................. B65B 29/00
[52] U.S. Cl. ........................... 426/392; 426/397; 426/398
[58] Field of Search ..................... 426/106, 127, 426/392, 397, 398; 428/34.8, 35.2, 35.7

[56] References Cited

U.S. PATENT DOCUMENTS

| | | | |
|---|---|---|---|
| 3,983,306 | 9/1976 | Nielinger et al. | 426/127 X |
| 4,965,135 | 10/1990 | Im et al. | 426/127 X |
| 5,418,068 | 5/1995 | Calvori et al. | 428/474.4 |

FOREIGN PATENT DOCUMENTS

| | | |
|---|---|---|
| 93 797 | 11/1983 | European Pat. Off. . |
| 378 856 | 7/1990 | European Pat. Off. . |
| 580 360 A1 | 1/1994 | European Pat. Off. . |
| 581 495 | 2/1994 | European Pat. Off. . |
| 2.132.395 | 11/1972 | France . |
| 41 42 978 | 12/1992 | Germany . |
| 1 335 791 | 10/1973 | United Kingdom . |

OTHER PUBLICATIONS

"Packaging Strategies" 11 (14), 2 (1993).
(J. Japan. Soc. Food Sci Tech 30 (8), 467 (1983)).
(Taiwan Food Science 13 (3/4), 117 (1986)).
(J Food Sci. 57 (3), 671 (1992)).
Abstract of Japan 50–10,196 (Apr. 18, 1975).
Abstract of Japan 57–53,134 (Nov. 11, 1982).
PCT/US 97/02251 International Search Report dated Jul. 4, 1997.

*Primary Examiner*—Leo B. Tentoni

[57] ABSTRACT

See-through, packaging structures for liquid or semi-liquid fruit or vegetable products, which have a polyamide food contact-layer of at least 0.4 mil. thickness, extends the color-life of the contained food product. The polyamide layer removes certain degradation products of polyphenolic compounds which otherwise would cause browning during storage. The packaging structures allow the contents and their color to be clearly seen by using a transparent film or sheet structural material having a polyamide surface-layer, the structural material being formed into a packaging structure. The packaging structure may be one such as a film pouch or a plastic bottle, the surface layer of the film or sheet forming the inner-surface food contact-layer of the packaging structure. Alternatively, a polyamide inner contact-layer in the lidding of a see-through package structure can be used, in which case the see-through package container portion itself need not have a polyamide inner contact-layer.

15 Claims, No Drawings

METHOD FOR REMOVING COMPOUNDS CAUSING DISCOLORATION IN FRUIT/VEGETABLES STORED IN SEE-THROUGH PACKAGING STRUCTURES

BACKGROUND OF THE INVENTION

1. Field of the invention

This invention is related to see-through packaging structures, for liquid or semi-liquid fruit or vegetable products. The structures have a polyamide food contact-layer, which extends the color-life of the contents. The polyamide layer removes many brown polyphenolic degradation products of various compounds present in fruits and vegetables which otherwise would lead to browning of the contents during storage. More particularly, the invention comprises any see-through packaging structure through which the liquid contents and their color can be clearly seen such as a film pouch or plastic bottle, which is formed from a transparent polymeric film or sheet having a polyamide surface-layer, the polyamide layer becoming an inner contact-layer of the packaging structure.

2. Discussion of Related Art

Fruit and vegetable juices discolor on aging for several reasons. One of these is formation of certain brownish polyphenolic materials via a non-enzymatic reaction. These polyphenolic compounds include certain 'degradation' products of anthocyanins, and of flavonoids, proanthocyanins and tannins, which themselves are polyphenolic compounds present in foods. The 'degradation' products may in many cases form from polycondensation reactions. Anthocyanins and related compounds, for instance, may be the desirable color giving substances in some foods, but with time can form undesirable brown polyphenolics. Proanthocyanidines are colorless, but their degradation products are colored. Browning is an especial problem in light-colored fruit and vegetable products such as strawberry, apricot, and orange juices, jams or jellies.

Polyamides have long been used as absorbents and filters ("clarifying agents") in the processing of beer, wine, fruit juice, and vegetable juices to remove certain undesirable polyphenolic compounds present in the fresh food product. For example, Japanese patent J82053134-B (assigned to Asahi Chemical and Ink) discloses an absorptive sheet containing polyamides and inorganic adsorbent for use in processing, but not in the storage or packaging of vegetable juices.

The mechanism by which polyamides remove these undesirable polyphenolic compounds is believed to be adsorption due to hydrogen bonding between phenolic hydroxyl groups and amide bonds in the protein 'polyamides'. Clarifying agents are used after the juice is produced (and fermented, in the case of beer and wine) but before it is packaged (ref.: Food Chemistry, Owen R. Fennema, ed., 1985, p 661–663).

Polyamides have also been used as the food contact-layer in food packaging to prevent 'scalping' (adsorption or absorption of essences which are taste components) by the package, but these are typically used in opaque or near opaque structures which also prevent or reduce light ingress, and where the color of the food is not readily seen by the consumer. Opaque packaging is frequently deliberately used because light can induce the formation of certain other types of degradation reactions. As an example of this type of packaging, unpasteurized, not-from-concentrate orange juice has been packaged in coextruded structures of nylon and HDPE as disclosed in 'Packaging Strategies' (11 (14), 2 (1993)). Nylon is used as the contact-layer because it does not scalp flavor. The HDPE is not transparent and the polyamide may not be depending on its type and thickness in the package. In this instance, the polyamide acts as a barrier to prevent adsorption or absorption of desirable compounds, (the flavor components), by the other layer or layers. By contrast, the purpose of the present invention is just the opposite; specifically to adsorb or absorb undesirable compounds, namely the brown degradation products.

Polyamides are also often used as an oxygen barrier-layer in packaging structures. However, because the oxygen barrier properties of polyamides are moisture sensitive, they are incorporated as an inner-layer of a multilayer structure when packaging liquid or semi-liquid foods with high moisture content. For example, Japanese Patent Publication No. 75-010196B describes a specific polyamide containing m-xylylenediamine which can be used in an oriented structure for packaging water-containing substances to prevent discoloration and spoilage, but the polyamide does not contact the product. In these structures, since the polyamide does not contact the product, it cannot remove polyphenolic compounds but it can act as an oxygen barrier.

Since some of the causes of browning are enzymatic, packaging these products in a structure with excellent oxygen barrier or gas flushing to remove oxygen will minimize other color changes. For example, a study of orange juice aged in various containers and analyzed over time for changes in browning, based on the level of hydroxymethyl furfural (ascorbic acid degradation product), showed that removal of oxygen and use of packaging with high oxygen barrier improved quality over time (J. Japan. Soc. Food Sci Tech 30 (8), 467 (1983)).

Similarly, studies on manufacture and packaging of candied fruits show that exclusion of oxygen (by using film with low oxygen permeability and/or vacuum packaging) reduces mold growth and browning of fruits (Taiwan Food Science 13 (3/4), 117 (1986)).

A study of multilayer films evaluated as packaging materials for hot-filled fruit products, comparing EVOH, PVDC, or nylon as the food contact-layer and applesauce as the fruit product showed that nylon performed worst (J Food Sci. 57 (3), 671 (1992)). Since apple sauce browns mainly by enzymatic (oxidative) browning, this result may be related to the effectiveness of the film as an oxygen barrier.

There is a need and desire for see-through packaging structures which are colorless, allowing the contents and color of liquid and semi-liquid food materials contained therein to be readily seen, yet which also strongly reduce non-enzymatic discoloration of those foods due to certain non-enzymatically formed polyphenolic degradation compounds.

SUMMARY OF THE INVENTION

The present invention provides a see-through package structure which is formed from transparent and colorless film or sheet. The structure allows the color and contents of liquid or semi-liquid food materials contained therein to be readily seen, yet it prevents, or strongly reduces over time, the color change or discoloration of those food materials caused by non-enzymatic formation of certain polyphenolic compound degradation products of certain polyphenolic compounds originally present in the food.

The invention specifically provides a see-through packaging structure comprising a transparent film or sheet structural material having at least two layers, one layer being a polyamide surface-layer having a thickness of at least 0.4 mil, the surface-layer produced by lamination, coextrusion, or solution coating, the film or sheet structural material formed into the packaging structure, the polyamide surface-layer forming an inner surface food contact-layer of the packaging structure, the polyamide selected from the group consisting of (i) amorphous polyamides and (ii) semi-crystalline polyamides, the maximum thickness of the polyamide layer in the case of semi-crystalline polyamides being sufficiently low to maintain transparency of the film or sheet structural material.

A further aspect of the invention is a method of producing a packaged product, the product comprising a packaging structure and a liquid or semi-liquid fruit product contained therein, the fruit product having improved color-retention, the method comprising:

(i) providing a transparent film or sheet structural material having a polyamide surface-layer of at least 0.4 mil thickness, (ii) forming the material into a see-through package structure such that the polyamide surface-layer forms an inner surface food contact-layer of the structure, (iii) filling or partially filling the structure with a liquid or semi-liquid fruit product, (iv) sealing the package structure, optionally using separate lidding, to form a packaged product.

A still further aspect of the invention is use of a polyamide layer as a food contact-layer which form part of the lidding portion of a see-through food package, either adhered or as a liner in the lidding. In this case, the see-through containing portion of the package need not have a polyamide food contact-layer, and the lid need not be transparent. The film or sheet which forms the container portion however must be transparent.

DETAILED DESCRIPTION OF THE INVENTION

The removal of undesirable brown degraded polyphenolic materials of the type described in this disclosure may be surface adsorption together with some internal absorption. While largely chemical in nature, it may include some mechanical occlusion. Whatever the precise mechanism of undesirable color removal, for convenience, the term absorption will be used to encompass all means of such color removal.

In this disclosure, the term transparent, as applied to the packaging film or sheet structural material means that the transmittance, the ratio of the intensity of light, in the visible spectrum, passing through to that incident on the specimen, normal to the plane of the material, is 90 percent or greater. The formed package structure is described as see-through, rather than transparent, because transparency which is a precisely measurable quantity can be measured on a film or sheet, but with a package, which may take many shapes, is itself not as readily amenable to a meaningful tranparency measurement.

Non-transparent or opaque materials are those where transmittance is almost zero, (usually due to scattering rather than absorption in the case of polymeric materials). In between are translucent materials. High forward scattering in such materials is generally referred to as haze. Most polymers show no specific absorption in the visible region, and are therefore colorless, unless impurities are present.

The term packaging structure is used to mean the container portion of a package. If it is sealable, it may form the total of the package, or it may be associated with a separate lidding portion. The polyamide surface-layer of the film or sheets used to form the packaging structure forms a food contact-layer. It must be capable of coming in direct contact with the food material since the degradation products of polyphenolic compounds which cause discoloration do not readily diffuse through polymeric materials. The polyamide is preferably not soluble in the food product to prevent extraction into the food.

In the principle aspect of this invention, when the packaging structure (rather than just the lidding) contains a polyamide food contact-layer, suitable polyamides for use in the present invention must form a transparent layer at the thickness used. This means they must be amorphous or, if semi-crystalline, either very low in crystallinity, or used at a thickness such that the structural sheet or film material forming the package body is transparent as defined above. Polymers are often referred to as crystalline, but, since they are never 100 percent crystalline, they are referred to here, as is more common, as semi-crystalline. Amorphous polymers or low crystalline polymers are preferred since they are generally inherently transparent.

Percent crystallinity is difficult to define precisely in a polymer, and depends on the precise method of measurement to some extent. As a guide, the common polyamide 66-nylon, which is one of the more crystalline polyamides, is often considered to be very roughly about 50 percent crystalline. This represents a relatively high crystallinity nylon (nylon being the term used for most synthetic polyamides) and it can be used in the present invention. However, the layer will generally need to be quite low to maintain transparency in the film or sheet structural material than lower crystallinity polyamides. The precise thickness limit for any given nylon is difficult to state precisely, since the crystallinity, and related transparency depends on just how the polyamide was processed. If it is melt processable, the melt temperature and rate of cooling and degree of orientation will all have an effect on the final transparency of the nylon layer. The laminate transparency will also depend on refractive index differences between the two or more layers, and other factors.

Amorphous nylons will generally be the most transparent materials, and can be used in thicker layers in the transparent film or sheet structural material. However, it will be generally be decreasingly attractive economically to use thick layers of polyamide, and a layer of between 0.4 and 5 mils. will generally be adequate. In addition, at greater thicknesses, it is not believed the inner part of the contact-layer would add much to the ability of the film or sheet structure to absorb the brown degraded polyphenolic materials.

Provided the thickness is above 0.4 mils, to provide sufficient material for degraded polyphenolic absorption, it will be within the skill of the artisan to determine how thick a particular polyamide layer can be employed, with a given polyamide, and to determine processing conditions, to maintain transparency of the structural film or sheet material.

Some polyamides, such as most nylon resins, can be melt-processed into films by well-known techniques such as extrusion coating, coextrusion, extrusion casting, or blowing. Certain natural polyamides such as zein and casein are not melt processable, but may be soluble, or at least capable of being deposited from a liquid medium. Polyamides which are soluble but not melt processible are suitable, but melt-processible polyamides are far preferred. Any amorphous melt processible nylon which is sufficiently melt stable and sufficiently lacking in impurities to be essentially colorless, will be suitable. Any semi-crystalline, melt-processible thermally stable polyamides are also suitable. Copolymers which include different diacids, lactams or diamines however will generally be lower in crystallinity, and more transparent, and will be preferred if cost considerations allow.

The term amorphous polyamide is well known to those skilled in the art and refers to those which are lacking in crystallinity as shown by a lack of an endotherm crystalline melting peak in a Differential Scanning Calorimeter measurement using ASTM D-3417m at 10° C./minute scanning rate.

Examples of amorphous polyamides that can be used include those prepared from the following diamines: hexamethylenediamine, 2-methylpentamethylenediamine, 2,2,4-trimethylhexamethylenediamine, bis(4-aminocycohexyl)methane, 2,2-bis(4-aminocyclohexyl) isopropylidene, 1,4-diaminocylcohexane, 1,3-diaminocylcohexane, meta-xylylenediamine, 1,5-diaminopentane, 1,4-diaminobutane, 1,3-diaminopropane, 2-ethyldiaminobutane, 1,4-diaminomethylcyclohexane, p-xylylenediamine, m-phenylenediamine, p-phenylenediamine, and alkyl substituted m-phenylenediamine and p-phenylenediamine.

Examples of amorphous polyamides that can be used include those prepared from the following dicarboxylic acids: isophthalic acid,(I), terphthalic acid,(T), alkyl substituted I and T acids, adipic acid sebacic acid, butane dicarboxylic acid and the like.

Certain all aromatic polyamides are known to be intractable under ordinary melt processing conditions, and thus are generally not suitable unless very readily soluble. The preferred amorphous polyamides are those in which either the damine or the diacid moiety is aromatic, and the other moiety is aliphatic. Specific examples of amorphous polyamides which are suitable for this invention include hexamethylenediamine isophthalamide, (6I), and hexamethylenediamine isophthalamide/terephthalamide 'copolymer', (6I/6T), having and I/T moiety ratio of 100/0 to 60/40, and copolymers of hexamethylenediamine and 2-methylpentamethylenediamine with I or T acids or mixtures of I and T acids.

Amorphous polyamides may also contain minor amounts of lactam species such as caprolactam or lauryl lactam.

Semi-crystalline polyamides refer to the traditional semi-crystalline nylons, which are generally prepared from lactams or amino acids or from condensation of diamines such as hexamethylenediamine with dibasic acids such as adipic and sebacid acids. Copolymers and terpolymers of these polyamides are included and are preferred, since they will be less crystalline and more transparent. The polyamides of the present invention are prepared by condensation polymerization or anhydrous polymerization which are well known to those skilled in the art.

Preferred polyamides are Selar® PA and 6 nylon and its copolymers and 6,6 nylon copolymers. Most preferred is Selar PA® this being an amorphous nylon which is a 6I/6T copolymer having an I/T ratio of between about 70/30 and 60/40, produced by E.I. du Pont de Nemours and Company Other suitable though less preferred polyamides, include soluble proteins such as zein and casein. These can be coated onto a substrate from solution. Insoluble (crosslinked) proteins such as keratin are inappropriate for use in the invention because they cannot readily be formed into films.

The package structure may be a pouch or similar flexible structure, or an injection or extrusion blow molded 'bottle' or a thermoformed sheet structure in container form.

The preferred packaging structure is a stand-up packaging structure. This may be a result of the particular form of the structure in a relatively flexible structure, or because the film or sheet structural material which forms all, or the walls of, the package is sufficiently rigid and the packaging structure has a stand-up form.

When the packaging structure is a pouch, the layered film or sheet material from which it is formed may by a polyamide/LDPE, polyamide/ionomer or a polyamide/EVA film. The latter is preferred. When the package is a stand-up structure, the preferred packaging material is a polyamide/polyester sheet, most preferably a polyamide/polyester/poly(vinylidene chloride), (PVDC), sheet. The PVDC layer forms an oxygen and moisture barrier. Such a barrier will reduce Vitamin C decomposition, which may be otherwise severe in a transparent structure. The polyester is preferably Mylar® which is biaxially oriented polyethylene terephthalate (PET), produced by E.I. du Pont de Nemours and Company. Other polyesters include PETG which is a copolymer which also contains cylcohexane dimethanol as well as polyethylene glycol as the diol monomer. Adhesives such as various acrylic adhesives may be used between layers.

The liquid and semi-liquid foods with which this invention is concerned are any foods which contain at least about 20 weight percent water, and are sufficiently low in viscosity to be fluid when filling a container, at the temperature at which the food in placed in the container. Generally the foods will still be fluid in the container, so that there is movement of the fluid, producing high food/polyamide contact. Readily pourable liquids/syrups are of particular relevence. However, less fluid materials such as sauces and even somewhat gelatinous foods are not excluded.

EXAMPLES

Tests designed to give an indication of ability to absorb and prevent brown colored materials discoloring the food product were carried out. The tests used the polyamide itself rather than a laminated film having a polyamide layer. These were designed to give at least an approximate indication of how they would perform as the inner-surface contact-layer of the package structure of the present invention.

Polyamides tested include soluble protein polyamides such as zein, and several synthetic polyamides (nylons). Orange juice was the major test material. Some tests with gelatinous strawberry jam gave good results for zein, but ambivalent results for nylons, as discussed below. Polyamides were tested by placing coupons on the bottom of 8 oz. glass jars and then topping them with 25 gr. fruit product. Coupons were prepared in the following ways. Proteins were coated onto discs of cheesecloth; zein (zein Regular Food Grade, supplied by Freeman Industries, Inc.) was coated from 60/40 acetone/water solution, and casein (tech. grade, supplied by Aldrich Chemical Co.) from 20% ammonium carbonate in water. Coated discs were dried in an air circulating oven at 50 C. for 3 days to ensure that all solvent was removed. Synthetic polyamides (Zytel® 101 a 6,6 nylon, and Selar® PA an amorphous nylon, both produced by E.I. du Pont de Nemours and Company) were tested using discs cut from extrusion cast films.

Samples were aged at 50° C. in an air-circulating oven. This represents an accelerated test since, in most instances, ageing of packaged fruit products under ambient conditions would not normally exceed about 40° C. Absorbance was measured on the fresh product and after aging for 20 days. Pass controls were stored in a refrigerator in 2 oz. glass jars covered with aluminum foil.

Change in color of the fruit product is measured by reading absorbance at 440 nm. This is a measure of the presence of browning compounds such as degraded anthocyanins. Samples were prepared for analysis by diluting 10.00 gr. sample to 100 ml with buffer pH 3.4 (for reading at 440 nm), or by diluting 5.00 gr. sample to 100 ml with 0.1N HCl (for reading at 500 nm). Absorbance was read using a Perkin Elmer Lambda 19 UV/VIS/NIR Spectrophotometer. Absorbance=−log (transmittance), where transmittance=intensity of transmitted beam/intensity of incident beam.

In the case of strawberry jam, absorbance read at 500 nm reflects overall color intensity (total original anthocyanin content which is largely responsible for the color of the jam initially). The ratio of the reading at 500 nm/reading at 440 nm is a good way of following overall undesirable color changes in strawberries (ref. Kertesz and Sondheimer, Anal. Chem. 20, 245 (1948). A lowering of the ratio reflects either a reduction in overall color (mostly due to initially present anthocyanins) or an increase in browning due to degradation products. Whether measuring an absorbance ratio or simply absorbance at a given wavelength, the most desirable result is when the curve of the absorbency vs. time or absorbance ratio vs time has a flat slope, since this reflects little change from the appearance of the original fresh product. An improvement (reduction) in either the rate of change of absorbance or in the rate of change of the ratio is considered an improvement in the color-life of the product.

It was found that all samples darken in color over time; this is not unexpected since, as noted previously, non-enzymatic browning is not the only cause of browning of fruit products. In these experiments, oxidative browning could occur because air was not removed from the atmosphere in which they were aged. However, the control aged in the absence of polyamide is significantly browner than the samples in the presence of polyamide.

In an example using orange juice, three polyamides were tested; zein, 66 nylon (Zytel® 101) and Selar ® PA, and a control with no polyamide. Initial absorbance at 440 nm was 0.39. After 19 days aging, as described above, the absorbance was 0.64 with no polyamide, 0.44 with zein, 0.575 with 66 nylon, and 0.56 for Selar® PA. Thus, all the polyamides improved (reduced) the amount of browning as shown by the smaller increase in absorbance for the polyamide samples than for the control. Zein was best, but has the disadvantage of not being melt-processible. Amorphous nylon Selar® PA and 6,6 nylon perform about equally, but amorphous Selar® PA has the advantage of greater transparency than semi-crystalline 6,6 nylon.

In a test with strawberry jam, the jam was mascerated in a Waring blender and filtered, then was tested as described above. A control with no polyamide, zein, Zytel® 101 and Selar® PA were tested. Inital absorbance ratio was 1.0. After 19 days aging, the ratio was 0.82 for the control, 0.93 for zein, 0.80 for Zytel® 101 and 0.75 for Selar® PA. Thus again, zein performed well. The synthetic polyamides in this test however, did not fair well. It is known that excessive blending can cause oxidative browning, and it is believed that inconsistency during sample preparation obscured the improvement known possible, and clearly seen in the case of orange juice, which was not subjected to treatment in a blender during sample preparation.

I claim:

1. An improved method for packaging a liquid or semi-liquid fruit or vegetable food product in a packaging structure and adsorbing discoloring materials from the food product, thus improving color-life of the food product, the method comprising:

a. providing a packaging structural material having a surface layer comprising polyamide, said surface layer is of at least 0.4 mil thickness, b. forming the packaging material into a packaging structure such that the polyamide layer of the material forms an inner-surface layer of the structure, c. filling or partially filling the packaging structure with a liquid or semi-liquid liquid fruit or vegetable food product having at least about 20 weight percent water such that:

i. the polyamide inner-surface layer of the structure is in contact with the food product;

ii. there is fluid movement of said food product in the packaging structure causing contact between said food product and said polyamide inner-surface layer;

d. sealing the package structure, optionally using separate lidding, to form a packaged product.

2. An improved method for packaging a liquid or semi-liquid fruit or vegetable food product in a packaging structure and adsorbing discoloring materials from the food product according to claim 1, wherein said packaging structure is a see-through bottling container.

3. An improved method for packaging a liquid or semi-liquid fruit or vegetable food product in a packaging structure and adsorbing discoloring materials from the food product according to claim 1, wherein the polyamide in the inner surface layer of the packaging structure is amorphous polyamide.

4. An improved method for packaging a liquid or semi-liquid fruit or vegetable food product in a packaging structure and adsorbing discoloring materials from the food product according to claim 1, wherein the amorphous polyamide in the inner surface layer of the packaging structure is hexamethylenediamine isophthalamide/terephthalamide copolymer, having a iso/terephthalamide ratio of 60/40 or greater.

5. An improved method for packaging a liquid or semi-liquid fruit or vegetable food product in a packaging structure and adsorbing discoloring materials from the food product, thus improving color-life of the food product, the method comprising:

a. forming a packaging structural material into a packaging structure having a see-through lid, optionally a removable see-through lid, with the inner surface layer of said see-through lid comprising a polyamide layer of at least 0.4 mil thickness, b. filling or partially filling the packaging structure with a liquid or semi-liquid liquid fruit or vegetable food product having at least about 20 weight percent water, c. covering the packaging structure with said see-through lid, and d. inducing fluid movement of said food product in the lidded packaging structure such that there is contact between said food product and said polyamide inner-surface layer.

6. An improved method for packaging a liquid or semi-liquid fruit or vegetable food product in a packaging structure and adsorbing discoloring materials from the food product according to claim 5, wherein said food product is a fruit or vegetable juice.

7. An improved method for packaging a liquid or semi-liquid fruit or vegetable food product in a packaging structure and adsorbing discoloring materials from the food product according to claim 5, wherein the polyamide in the inner surface layer of said see-through lid is amorphous polyamide.

8. An improved method for adsorbing discoloring materials from packaged liquid or semi-liquid fruit or vegetable food product and extending color life of said packaged food product, the method comprising:

a) containing said food product in a packaging structure, wherein said packaging structure comprises a polyamide inner-surface layer of at least 0.4 mil thickness and said liquid or semi-liquid fruit or vegetable food product has at least about 20 weight percent water and remains fluid in said container; and b) inducing fluid movement of said food product in said packaging structure such that there is contact between said food product and said polyamide inner-surface layer.

9. An improved method for adsorbing discoloring materials from packaged liquid or semi-liquid fruit or vegetable food product and extending color life of said packaged food product according to claim 8, wherein said packaging structure is a see-through bottling container.

10. An improved method for adsorbing discoloring materials from packaged liquid or semi-liquid fruit or vegetable food product and extending color life of said packaged food product according to claim 8, wherein said polyamide inner-surface layer of the structure in contact with the liquid or semi-liquid liquid fruit or vegetable food product is a see-through lid.

11. An improved method for adsorbing discoloring materials from the food product according to claim 8, wherein the polyamide layer is a liner adhering to the inner surface layer of said packaging structure.

12. An improved method for adsorbing discoloring materials from the food product according to claim 8, wherein said food product is a fruit or vegetable juice.

13. An improved method for adsorbing discoloring materials from packaged liquid or semi-liquid fruit or vegetable food product and extending color life of said packaged food product according to claim 8, wherein the polyamide in the inner surface layer of the packaging structure is amorphous polyamide.

14. An improved method for adsorbing discoloring materials from packaged liquid or semi-liquid fruit or vegetable food product and extending color life of said packaged food product according to claim 8, wherein the amorphous polyamide in the inner surface layer of the packaging structure is hexamethylenediamine isophthaiamide/terephthalamide copolymer, having a iso/terephthalamide ratio of 60/40 or greater.

15. An improved method for adsorbing discoloring materials from packaged liquid or semi-liquid fruit or vegetable food product and extending color life of said packaged food product according to claim 8, wherein:

said liquid or semi-liquid fruit or vegetable food product contains degradation products of polyphenolic compounds; and the polyamide in the inner layer surface layer of said packaging structure adsorbs said degradation products from said food product.

* * * * *

UNITED STATES PATENT AND TRADEMARK OFFICE
CERTIFICATE OF CORRECTION

PATENT NO. : 5,897,901
DATED : April 27, 1999
INVENTOR(S) : Donna Lynn Visioli It is certified that error appears in the above-identified patent and that said Letters Patent is hereby corrected as shown below:

Claim 1 c, column 8, line 8, change "liquid or semi-liquid liquid fruit or vegetable food" to --liquid or semi-liquid fruit or vegetable food--

Signed and Sealed this

Twentieth Day of March, 2001

Attest:

NICHOLAS P. GODICI

*Attesting Officer*   *Acting Director of the United States Patent and Trademark Office*